United States Patent
Hicks et al.

(10) Patent No.: US 10,963,366 B2
(45) Date of Patent: Mar. 30, 2021

(54) REGRESSION TEST FINGERPRINTS BASED ON BREAKPOINT VALUES

(71) Applicant: INTERNATIONAL BUSINESS MACHINES CORPORATION, Armonk, NY (US)

(72) Inventors: Andrew Hicks, Wappingers Falls, NY (US); Dale E. Blue, Poughkeepsie, NY (US); Ryan Rawlins, New Paltz, NY (US); Steven Partlow, Beacon, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/440,404

(22) Filed: Jun. 13, 2019

(65) Prior Publication Data
US 2020/0394118 A1 Dec. 17, 2020

(51) Int. Cl.
*G06F 9/44* (2018.01)
*G06F 11/36* (2006.01)

(52) U.S. Cl.
CPC ...... *G06F 11/3612* (2013.01); *G06F 11/3688* (2013.01)

(58) Field of Classification Search
CPC .............. G06F 11/3612; G06F 11/3688
USPC .................................. 717/124–130
See application file for complete search history.

(56) References Cited

U.S. PATENT DOCUMENTS

| 5,153,881 A | 10/1992 | Bruckert |
| 5,185,877 A | 2/1993 | Bissett |
| 5,694,540 A * | 12/1997 | Humelsine ............... G06F 8/71 714/33 |
| 5,758,062 A * | 5/1998 | McMahon ........... G06F 11/3688 714/33 |
| 6,601,018 B1 * | 7/2003 | Logan ................ G06F 11/3684 702/186 |

(Continued)

FOREIGN PATENT DOCUMENTS

| WO | 2016138953 A1 | 9/2016 |
| WO | 2018162048 A1 | 9/2018 |

OTHER PUBLICATIONS

Anderson et al, "Customized Regression Testing Using Telemetry Usage Patterns", IEEE, pp. 572-581 (Year: 2016).*

(Continued)

*Primary Examiner* — Anil Khatri
(74) *Attorney, Agent, or Firm* — Cantor Colburn LLP; Teddi Maranzano

(57) ABSTRACT

Systems, methods, and computer-readable media are described for generating fingerprints for regression tests that identify code paths taken during execution of the regression tests. Breakpoint values are assigned to breakpoints encountered during execution of a regression test and a fingerprint is generated based on the assigned breakpoint values and a code path taken during execution of the regression test. Various breakpoint value assignment/fingerprint generation algorithms are described herein that generate a fingerprint from which a corresponding code path taken can be reconstructed including which breakpoints are encountered, the number of times each such breakpoint is encountered, and the order in which the breakpoints are encountered.

14 Claims, 9 Drawing Sheets

(56) References Cited

U.S. PATENT DOCUMENTS

| | | | |
|---|---|---|---|
| 6,718,485 B1* | 4/2004 | Reiser | G06F 11/3466 |
| | | | 712/227 |
| 7,093,238 B2 | 8/2006 | Givoni | |
| 7,178,063 B1 | 2/2007 | Smith | |
| 7,315,634 B2 | 1/2008 | Martin | |
| 7,552,425 B2 | 6/2009 | Bates et al. | |
| 7,596,778 B2* | 9/2009 | Kolawa | G06F 11/3688 |
| | | | 717/126 |
| 7,617,074 B2 | 11/2009 | Beish | |
| 7,640,470 B2 | 12/2009 | Lammel | |
| 7,640,740 B2 | 1/2010 | Lammel | |
| 7,721,265 B1* | 5/2010 | Xu | G06F 9/45512 |
| | | | 717/127 |
| 7,840,944 B2* | 11/2010 | Brunswig | G06F 11/3688 |
| | | | 717/124 |
| 7,945,898 B1 | 5/2011 | Episkopos et al. | |
| 7,958,400 B2* | 6/2011 | Ur | G06F 11/3616 |
| | | | 717/126 |
| 7,962,798 B2 | 6/2011 | Locasto | |
| 8,296,605 B2 | 10/2012 | John | |
| 8,301,757 B2 | 10/2012 | Catlin | |
| 8,370,816 B2 | 2/2013 | Farchi et al. | |
| 8,479,171 B2 | 7/2013 | Ghosh | |
| 8,504,997 B2* | 8/2013 | Tkachuk | G06F 11/3696 |
| | | | 717/131 |
| 8,527,813 B2 | 9/2013 | Budnik | |
| 8,549,480 B2* | 10/2013 | Cohen | G06F 11/368 |
| | | | 717/125 |
| 8,554,811 B2 | 10/2013 | Mariani | |
| 8,649,995 B2 | 2/2014 | Thulasidasan et al. | |
| 8,756,460 B2 | 6/2014 | Blue et al. | |
| 8,775,886 B2 | 7/2014 | Mellen | |
| 8,806,450 B1* | 8/2014 | Maharana | G06F 11/3688 |
| | | | 717/133 |
| 8,949,674 B2* | 2/2015 | Mancoridis | G06F 11/3612 |
| | | | 714/38.1 |
| 8,954,926 B2 | 2/2015 | Braun et al. | |
| 8,954,930 B2 | 2/2015 | Kamenz | |
| 8,997,061 B1 | 3/2015 | Davison | |
| 9,063,899 B2* | 6/2015 | Epstein | G06F 8/52 |
| 9,098,635 B2 | 8/2015 | Peri-Glass et al. | |
| 9,111,033 B2 | 8/2015 | Bates | |
| 9,202,005 B2 | 12/2015 | Goswami et al. | |
| 9,286,313 B1 | 3/2016 | Sharangpani | |
| 9,317,410 B2* | 4/2016 | Eilam | G06F 11/3676 |
| 9,336,122 B2 | 5/2016 | Kilzer et al. | |
| 9,454,466 B2 | 9/2016 | Ivrii et al. | |
| 9,489,289 B2 | 11/2016 | Hu | |
| 9,513,998 B2 | 12/2016 | Coronado | |
| 9,529,701 B2 | 12/2016 | Ekambaram et al. | |
| 9,600,403 B1 | 3/2017 | Raz | |
| 9,626,277 B2 | 4/2017 | Thangamani | |
| 9,720,766 B2 | 8/2017 | Lee | |
| 9,734,263 B2 | 8/2017 | Kohavi et al. | |
| 9,779,013 B2 | 10/2017 | Narayan et al. | |
| 9,857,959 B2 | 1/2018 | Dhawal | |
| 9,864,675 B2 | 1/2018 | Ug | |
| 9,916,414 B2 | 3/2018 | Jeong | |
| 9,990,272 B2 | 6/2018 | Cooper | |
| 9,996,452 B2 | 6/2018 | Cooper et al. | |
| 10,061,685 B1 | 8/2018 | White | |
| 10,073,763 B1 | 9/2018 | Raman | |
| 10,152,479 B1 | 12/2018 | Granstrom | |
| 10,383,553 B1* | 8/2019 | Glenn | G16H 10/20 |
| 10,430,318 B1* | 10/2019 | Ansari | G06F 11/3688 |
| 10,754,756 B2* | 8/2020 | Ocariza, Jr. | G06F 11/3636 |
| 2003/0233600 A1 | 12/2003 | Hartman | |
| 2004/0154001 A1 | 8/2004 | Haghighat et al. | |
| 2006/0179386 A1 | 8/2006 | Pushpavanam | |
| 2008/0172652 A1 | 7/2008 | Davia et al. | |
| 2010/0023928 A1 | 1/2010 | Hentschel et al. | |
| 2010/0100871 A1 | 4/2010 | Celeskey | |
| 2010/0287534 A1 | 11/2010 | Vangala et al. | |
| 2011/0016457 A1 | 1/2011 | Artzi et al. | |
| 2011/0145653 A1 | 6/2011 | Broadfoot | |
| 2012/0191443 A1 | 7/2012 | Amalfitano | |
| 2012/0253728 A1 | 10/2012 | Chamas | |
| 2012/0260132 A1 | 10/2012 | Blue | |
| 2013/0152047 A1 | 6/2013 | Moorthi | |
| 2014/0059081 A1 | 2/2014 | Farchi et al. | |
| 2014/0095933 A1 | 4/2014 | Griesinger | |
| 2014/0372083 A1 | 12/2014 | Hsu et al. | |
| 2015/0094997 A1 | 4/2015 | Ivrii et al. | |
| 2015/0106653 A1 | 4/2015 | Adler et al. | |
| 2016/0378618 A1 | 12/2016 | Cmielowski et al. | |
| 2017/0060734 A1 | 3/2017 | Raz et al. | |
| 2017/0103013 A1 | 4/2017 | Grechanik | |
| 2017/0132119 A1 | 5/2017 | Xu et al. | |
| 2017/0199810 A1 | 7/2017 | Hamilton | |
| 2017/0262361 A1 | 9/2017 | Francis | |
| 2017/0270035 A1 | 9/2017 | Nie | |
| 2018/0024911 A1 | 1/2018 | Kruszewski et al. | |
| 2018/0052725 A1 | 2/2018 | Hannson | |
| 2018/0095867 A1 | 4/2018 | Varadarajan et al. | |
| 2018/0293156 A1 | 10/2018 | Zeng | |
| 2018/0300226 A1 | 10/2018 | Manolios | |
| 2018/0329807 A1 | 11/2018 | Atyam | |
| 2019/0332523 A1 | 10/2019 | Gefen | |
| 2020/0242011 A1 | 7/2020 | Hicks | |
| 2020/0242012 A1 | 7/2020 | Hicks | |
| 2020/0242013 A1 | 7/2020 | Hicks | |

OTHER PUBLICATIONS

Rothermel et al, "Analyzing Regression Test Selection Techniques", IEEE, pp. 529-551 (Year: 1996).*

Tsai et al, "Scenario-Based Object-Oriented Test Frameworks for Testing Distributed Systems", IEEE, pp. 1-7 (Year: 2003).*

Chakrabarti et al, "Specification Based Regression Testing Using Explicit State Space Enumeration", IEEE, pp. 1-6 (Year: 2006).*

Bures et al, "Tapir: Automation Support of Exploratory Testing Using Model Reconstruction of the System Under Test", IEEE, pp. 557-580 (Year: 2018).*

Tsai et al, "Adaptive Scenario-Based Object-Oriented Test Frameworks for Testing Embedded Systems ", IEEE, pp. 1-16 (Year: 2002).*

Zhong et al, "TestSage: Regression Test Selection for Large-scale Web Service Testing", IEEE, pp. 430-440 (Year: 2019).*

Anonymous, "A Method and System for Providing Collaborative Platform as a Service for Aiding Machine Learning Development," IP.com (IPCOM000256095D). Nov. 2, 2018. 5 pages.

Anonymous, "Black Hole Testing—Machine Learning Program Behavior Patterns from Massive Automated Test Results," IP.com (IPCOM000243987D). Nov. 4, 2015. 8 pages.

Anonymously Disclosed "A system and method for setting breakpoints automatically by comparing correct and incorrect runs" IP.com No. IPCOM000252399D, Publication Date: Jan. 8, 2018, 5 pages.

Anonymously Disclosed "Advanced Interrogative Debugger for data-centric domain", IP.com No. IPCOM000226865D, Publication Date: Apr. 23, 2013, 14 pages.

Anonymously Disclosed "Cognitive, Self-Instrumenting Code on Detection of an Issue" IP.com No. IPCOM000253277D; Publication Date: Mar. 19, 2018; 4 pgs.

Anonymously Disclosed "Method and system to find potential program defect based on run-time variable change analysis", IP.com No. IPCOM000248699D, Publication Date: Dec. 28, 2016, 8 pages.

Anonymously Disclosed "Method for a debugging tool for finding variable value in application stack", IP.com No. IPCOM000209789D, Publication Date: Aug. 15, 2011, 5 pages.

Anonymously Disclosed "Method to enable debugger breakpoint inside statement", IP.com No. IPCOM000206941D, Publication Date: May 13, 2011, 8 pages.

Anonymously Disclosed "Simple Automated Code Coverage Method for test metrics", IP.com No. IPCOM000201864D, Publication Date: Nov. 29, 2010, 6 pages.

Anonymously Disclosed "Structured enhanced breakpoint chain", IP.com No. IPCOM000244264D, Publication Date: Nov. 27, 2015, 4 pages.

(56) References Cited

OTHER PUBLICATIONS

Anonymously Disclosed "System and method for improved regression failure analysis and easier debugging of test failures", IP.com No. IPCOM000209599D, Publication Date: Aug. 10, 2011, 6 pages.
Astigarraga, Tara "IBM Test Overview and Best Practices", IBM, Nov. 2012, pp. 1-53.
Cohen, D. M. et al., "The AETG system: An approach to testing based on combinatorial design." IEEE Transactions on Software Engineering, 23(7), pp. 437-444. Jul. 1997.
Compuware Corporation "Validate Testing Thoroughness and Provide Application Analysis", 2014, 4 pages.
De Souza et al., "Spectrum-based Software Fault Localization: A Survey of Techniques, Advances and Challenges" Dept. of Computer Science—University of Sao Paulo; arXiv:1607.04347v2 [cs.SE]; Nov. 26, 2017, 46 pages.
Devai, Gergely et al., "UML Model Execution via Code Generation" Eotvos Lorand University, Faculty of Informatics, Budapest, Hungary 2017, pp. 9-15.
Hicks et al., "Champion Test Case Generation", U.S. Appl. No. 16/256,949, filed Jan. 24, 2019.
Hicks et al., "Combinatoric Set Completion Through Unique Test Case Generation", U.S. Appl. No. 16/256,394, filed Jan. 24, 2019.
Hicks et al., "Fault Detection and Localization Using Combinatorial Test Design Techniques While Adhering to Archtiectural", U.S. Appl. No. 16/256,391, filed Jan. 24, 2019.
Hicks et al., "Reduction of Test Infrastructure", U.S. Appl. No. 16/440,781, filed Jun. 13, 2019.
Hicks et al., "Self Healing Software Utilizing Regression Test Fingerprints", U.S. Appl. No. 16/440,833, filed Jun. 13, 2019.
Hicks et al., "Test Space Analysis Across Multiple Combinatoric Models", U.S. Appl. No. 16/256,388, filed Jan. 24, 2019.
Hicks et al., "Associating Attribute Seeds of Regression Test Cases With Breakpoint Value-Based Fingerprints," U.S. Appl. No. 16/440,857, filed Jun. 13, 2019.
Hicks et al., "Breakpoint Value-Based Version Control," U.S. Appl. No. 16/440,800, filed Jun. 13, 2019.
Hicks et al., "Customizable Test Set Selection Using Code Flow Trees," U.S. Appl. No. 16/440,751, filed Jun. 13, 2019.
Hicks et al., "Fault Detection Using Breakpoint Value-Based Fingerprints of Failing Regression Test Cases," U.S. Appl. No. 16/440,810, filed Jun. 13, 2019.
Hicks et al., "Fault Detection and Localization to Generate Failing Test Cases Using Combinatorial Test Design Techniques", U.S. Appl. No. 16/256,388, filed Jan. 24, 2019.
IBM "Assuring Software Quality by Automatic Generation of Test Cases and Automatic Analysis of Test Case Results for Derivation and Regression Error Determination" IP.com No. IPCOM000180300D; Publication Date: Mar. 6, 2009; 6 pgs.
IBM, "InspectioN Testing Using Debugging Capabilities to Allow Combinational Testing", IP.com No. IPCOM000188370D, Electronic Publication Date: Oct. 2, 2009, 3 pages.
IBM, "Tool and Strategy for testing and validating software components at the source code level", IP.com No. IPCOM000180330D, Publication Date: Mar. 6, 2009, 3 pages.
IBM, Method of preventing build failures by searching through levels in a multi-level revision control system IP.com No. IPCOM000179779D, Publication Date: Feb. 25, 2009, 3 pages.
Koch, Gernot et al., "Breakpoints and Breakpoint Detection in Source Level Emulation", Forschungszentrum Informatik (FZI), Haid-und-Neu-Strabe 10-14, D 76131 Karlsruhe, DE; University of Tübingen, Sand 13, D 72076 Tübingen, DE, 2017, 6 pages.
Kuhn, Rick "Introduction to Combinatorial Testing", NIST, Carnegie-Mellon University, Jun. 7, 2011, 48 pages.
Leon et al., "An empirical evaluation of test case filtering techniques based on exercising complex information flows," Proceedings of the 27th International Conference on Software Engineering, pp. 412-421. ACM, 2005.
Kamalakar, Sunil, "Automatically Generating Tests from Natural Language Descriptions of Software Behavior," Virginia Polytechic Institute and State University, Sep. 23, 2013. 72 pages.
List of IBM Patents or Patent Applications Treated As Related; Date Filed: Jul. 19, 2019, 2 pages.
Mathur et al., "Adaptive Automation: Leveraging Machine Learning to Support Uninterrupted Automated Testing of Software Applications" arXiv.org, Aug. 4, 2015. 6 pages.
Nguyen et al., "Combining model-based and combinatorial testing for effective test case generation," Proceedings of the 2012 International Symposium on Software Testing and Analysis, Jul. 15-20, 2012. pp. 100-110.
Petke, J. et al., "Efficiency and early fault detection with lower and higher strength combinatorial interaction testing". In Proceedings of the 2013 9th Joint Meeting on Foundations of Software Engineering, pp. 26-36. Aug. 18-26, 2013.
Segall "Combinatorial Test Design" IBM Haifa Research Labs, 2012, pp. 1-49.
Shakya, K. & Xie, T., "Isolating Failure-Inducing Combinations in Combinatorial Testing using Test Augmentation and Classification ", CT 2012 workshop, (23 pages).
Soffa, Mary Lou et al. Exploiting Hardware Advances for Software Testing and Debugging (NIER Track) ICSE '11; May 21-28, 2011; 4 pgs.
Yilmaz et al., "Moving forward with combinatorial interaction testing," Computer, 47(2). Feb. 2014. pp. 37-45.
"All pair testing" wikipedia page from dated Sep. 14, 2017, retrieved using the WayBackMachine, from https://web.archive.org/web/20170914145543/https://en.wikipedia.org/wiki/All-pairs_testing (Year: 2017).
"CPC Cooperative Patent Classification, G06F Electrical Digital Dat Processing" of Apr. 2015, retrieved from https://www.cooperativepatentclassification.org/cpc/ (Year: 2015).
Bromme et al., "A Conceptual Framework for Testing Biometric Algorithms within Operating Systems' Authentication", ACM, pp. 273-280 (Year: 2002).
Wikipedia "Cartesian Product" web page, from date Jan. 15, 2019, retrieved from https://web.archive.org/web/20190115231627/https://en.wikipedia.org/wiki/Cartesian_product (Year: 2019).
Yilmaz et al., "Moving forward with combinatorial interaction testing", Feb. 2014, 47(2), pp. 37-45.

* cited by examiner

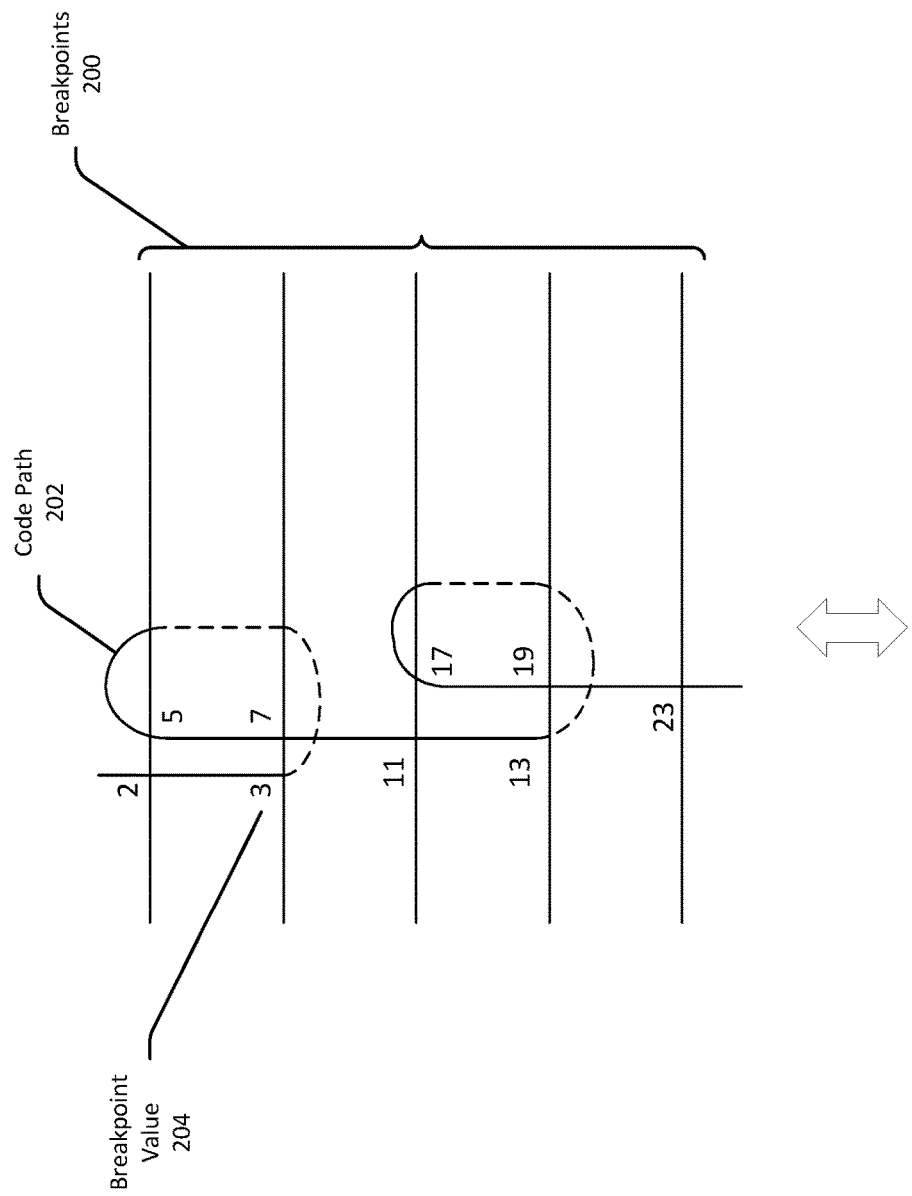

REGRESSION TEST FINGERPRINTS BASED ON BREAKPOINT VALUES

RELATED APPLICATIONS

This application which claims the benefits of multiple legally related applications including Application titled "FAULT DETECTION AND LOCALIZATION TO GENERATE FAILING TEST CASES USING COMBINATORIAL TEST DESIGN TECHNIQUES" assigned Ser. No. 16/256,388, filed Jan. 24, 2019; Application titled "FAULT DETECTION AND LOCALIZATION USING COMBINATORIAL TEST DESIGN TECHNIQUES WHILE ADHERING TO ARCHITECTURAL RESTRICTIONS" assigned Ser. No. 16/256,391, filed Jan. 24, 2019; Application titled "COMBINATORIC SET COMPLETION THROUGH UNIQUE TEST CASE GENERATION" assigned Ser. No. 16/256,394, filed Jan. 24, 2019; Application titled "TEST SPACE ANALYSIS ACROSS MULTIPLE COMBINATORIC MODELS" assigned Ser. No. 16/256,179, filed Jan. 24, 2019; Application titled "CHAMPION TESTCASE GENERATION" assigned Ser. No. 16/256,949, filed Jan. 24, 2019; Application titled "CUSTOMIZABLE TEST SET SELECTION USING CODE FLOW TREES," Ser. No. 16/440,751, not yet filed; Application titled "SELF HEALING SOFTWARE UTILIZING REGRESSION TEST FINGERPRINTS," Ser. No. 16/440,833, not yet filed; Application titled "REDUCTION OF TEST INFRASTRUCTURE," Ser. No. 16/440,781, not yet filed; Application titled "BREAKPOINT VALUE-BASED VERSION CONTROL," Ser. No. 16/440,800, not yet filed; Application titled "FAULT DETECTION USING BREAKPOINT VALUE-BASED FINGERPRINTS OF FAILING REGRESSION TEST CASES," Ser. No. 16/440,810, not yet filed; and Application titled "ASSOCIATING ATTRIBUTE SEEDS OF REGRESSION TEST CASES WITH BREAKPOINT VALUE-BASED FINGERPRINTS," Ser. No. 16/440,857, not yet filed, with all the benefits accruing therefrom, the contents of which in its entirety are herein incorporated by reference.

BACKGROUND

The present invention relates generally to regression testing, and more particularly, to the generation and use of fingerprints that identify code paths and/or lines of code traversed by regression tests.

Breakpoints are intentional stopping or pausing points in a program, typically inserted for the purposes of debugging. More generally, a breakpoint is a means of acquiring knowledge about a program's execution. When a breakpoint is reached during execution, a test environment (e.g., general purpose registers, memory, logs, files, etc.) is inspected to attempt to determine whether the program is functioning as expected. Breakpoints are commonly used to interrupt a running program immediately before execution of particular program instructions, in which case, they may be referred to as instruction breakpoints.

SUMMARY

In one or more example embodiments, a method for generating a fingerprint for a regression test run on a System Under Test (SUT) is disclosed. The method includes identifying the regression test, assigning breakpoint values to breakpoints associated with the SUT, and executing the regression test on the SUT. The method further includes determining a code path traversed during execution of the regression test and determining the fingerprint for the regression test based at least in part on the code path and the assigned breakpoint values.

In one or more other example embodiments, a system for generating a fingerprint for a regression test run on a System Under Test (SUT) is disclosed. The system includes at least one memory storing computer-executable instructions and at least one processor configured to access the at least one memory and execute the computer-executable instructions to perform a set of operations. The operations include identifying the regression test, assigning breakpoint values to breakpoints associated with the SUT, and executing the regression test on the SUT. The operations further include determining a code path traversed during execution of the regression test and determining the fingerprint for the regression test based at least in part on the code path and the assigned breakpoint values.

In one or more other example embodiments, a computer program product for generating a fingerprint for a regression test run on a System Under Test (SUT) is disclosed. The computer program product includes a computer readable storage medium having program instructions embodied therewith. The program instructions are executable by a processing circuit to cause the processing circuit to perform a method. The method includes identifying the regression test, assigning breakpoint values to breakpoints associated with the SUT, and executing the regression test on the SUT. The method further includes determining a code path traversed during execution of the regression test and determining the fingerprint for the regression test based at least in part on the code path and the assigned breakpoint values.

BRIEF DESCRIPTION OF THE DRAWINGS

The detailed description is set forth with reference to the accompanying drawings. The drawings are provided for purposes of illustration only and merely depict example embodiments of the invention. The drawings are provided to facilitate understanding of the invention and shall not be deemed to limit the breadth, scope, or applicability of the invention. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIGS. 2A and 2B depict example code paths taken during regression testing and corresponding fingerprints generated in accordance with a prime number-based fingerprint generation algorithm in accordance with one or more example embodiments of the invention.

DETAILED DESCRIPTION

Figure 1:
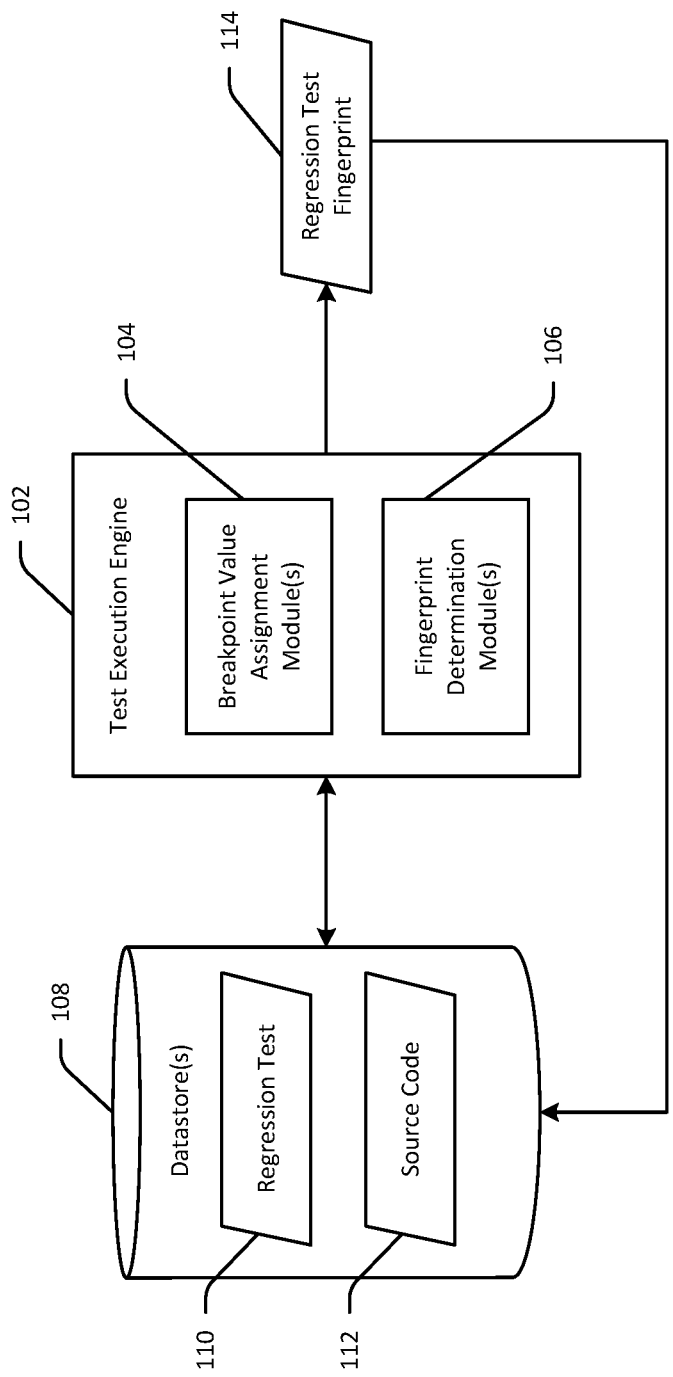
FIG. 1 is a schematic hybrid data flow/block diagram illustrating generation of a fingerprint for a regression test in accordance with one or more example embodiments of the invention.

Example embodiments of the invention relate to, among other things, devices, systems, methods, computer-readable media, techniques, and methodologies for generating a fingerprint of a regression test that identifies a code path traversed by the regression test and/or specific lines of codes encountered during execution of the regression test. The regression test may be executed on a System Under Test (SUT). While example embodiments may be described herein with respect to regression testing of a software system such as a body of source code, it should be appreciated that the SUT may be a hardware system or a software system.

As part of the software development process, source code coverage techniques are becoming increasingly more valuable in the pursuit of higher-quality software products. One such technique involves the use of breakpoints, which are points in the execution of source code that occur before or after one or more lines of source code and that can halt execution of the program or trigger specific tools. Conventional breakpoint usage relies on a manual process of marking interesting lines of source code that encapsulate a set of commonly used functions and routines such as, for example, procedure entries and exits.

This conventional process for using breakpoints, however, suffers from a number of technical drawbacks including the inability to recover the specific code paths taken to drive a given set of routines. For instance, conventional breakpoint usage provides no indication of the number of times any given breakpoint is encountered during execution of a regression test or the order in which the breakpoints are encountered. As used herein, a code path may refer to a path traversed during execution of at least a portion of source code and may indicate a number of times each breakpoint is encountered and/or an order in which such breakpoints are encountered during execution. This lack of granularity with conventional breakpoint usage makes complete code coverage during quality testing very unlikely, leading to weaker regression test buckets and increasing the likelihood that defects remain in a final product.

Example embodiments of the invention address the above-described technical problems associated with conventional breakpoint usage by providing various mechanisms for assigning breakpoint values to breakpoints such that a fingerprint can be generated for a regression test that contains information that is mutable and reversible to enable an identification of at least which breakpoints are encountered during execution of the regression test and a number of times each such breakpoint is encountered. In addition, certain mechanisms disclosed herein provide a regression test fingerprint that uniquely identifies a code path traversed during execution of a regression test. That is, certain example embodiments relate to breakpoint value assignment algorithms that generate a unique regression test fingerprint that contains information from which the code path taken by the regression test can be reconstructed including which breakpoints are encountered during execution of the regression test, a number of times each such breakpoint is encountered, and an order in which breakpoints are encountered.

Thus, example embodiments of the invention relate to breakpoint value assignment algorithms that provide the technical effect of generating regression test fingerprints from which code paths taken during execution of the regression tests can be recovered. This technical effect represents a technical solution over conventional breakpoint usage which does not allow for reconstruction of code paths taken. This technical effect constitutes an improvement to computer technology—specifically regression testing technology—because it enables more efficient regression tests to be generated based on corresponding fingerprints. More specifically, example embodiments of the invention enable resources such as time and processor cycles to be more effectively utilized to run tests that target specific code paths (as gleaned from the regression test fingerprints) or functions that may contain weak points. This more efficient usage of resources enabled by example embodiments of the invention further allows for more tests to be run in a given test cycle, thereby providing greater quality assurance against the SUT and constituting an additional improvement to technology.

Illustrative methods in accordance with example embodiments of the invention and corresponding data structures (e.g., program modules) for performing the methods will now be described. It should be noted that each operation of the method 500 depicted in FIG. 5 may be performed by one or more of the program modules or the like depicted in FIG. 1 or FIG. 6, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 5:
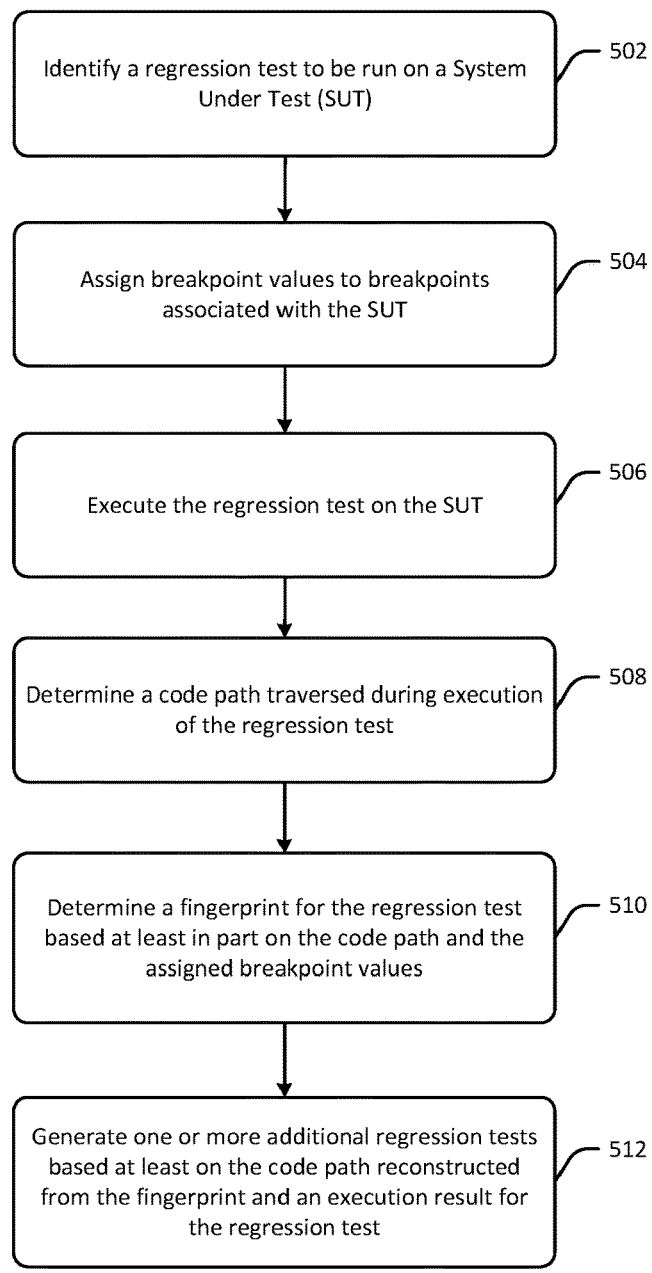
FIG. 5 is a process flow diagram of an illustrative method for generating a fingerprint of a regression test that identifies a code path traversed during execution of the regression test in accordance with one or more example embodiments of the invention.

FIG. 1 is a schematic hybrid data flow/block diagram illustrating generation of a fingerprint for a regression test in accordance with one or more example embodiments of the invention. FIG. 5 is a process flow diagram of an illustrative method 500 for generating a fingerprint of a regression test that identifies a code path traversed during execution of the regression test in accordance with one or more example embodiments of the invention. FIG. 5 will be described in conjunction with FIG. 1 hereinafter.

At block 502 of the method 500, a test execution engine 102 may identify a regression test 110 to run on a SUT. The test execution engine 102 may retrieve the regression test 110 from one or more datastores 108. In example embodiments, the regression test 110 may be executed on source code 112, which may also be retrieved from the datastore(s) 108. In example embodiments, inputs to the source code 112 to be tested may be modeled as a collection of attribute-value pairs. As such, in certain example embodiments, the regression test 110 may be a test case designed to test the operation of the source code 112 with respect to a particular combination of attribute values.

At block 504 of the method 500, computer-executable instructions of one or more breakpoint value assignment modules 104 may be executed to assign breakpoint values to breakpoints associated with the SUT. For instance, in example embodiments, computer-executable instructions of the breakpoint value assignment module(s) 104 may be executed to assign a respective value to each of one or more breakpoints inserted into the source code 112. At block 506 of the method 500, the test execution engine 102 may execute the regression test 110 on the SUT. For instance, the test execution engine 102 may execute the regression test 110 on the source code 112.

At block 508 of the method 500, computer-executable instructions of one or more fingerprint determination modules 106 may be executed to determine a code path traversed during execution of the regression test 110. The code path may include which breakpoints are encountered during execution of the regression test 110 and the number of times each such breakpoint is encountered as well as, potentially, an order in which the breakpoints are encountered. At block 510 of the method 500, computer-executable instructions of the fingerprint determination module(s) 106 may be executed to determine a fingerprint 114 for the regression test 110 based at least in part on the code path and the assigned breakpoint values.

Finally, at block 512 of the method 500, one or more additional regression tests may be generated based at least in part on the code path reconstructed from the fingerprint and an execution result for the regression test executed at block 506. For instance, if the regression test results in a failure result, the corresponding code path (including potentially the order in which breakpoints are encountered) can be discerned from the fingerprint, and additional regression tests designed to drive the same or a similar code path can be generated and executed.

Figure 2B:
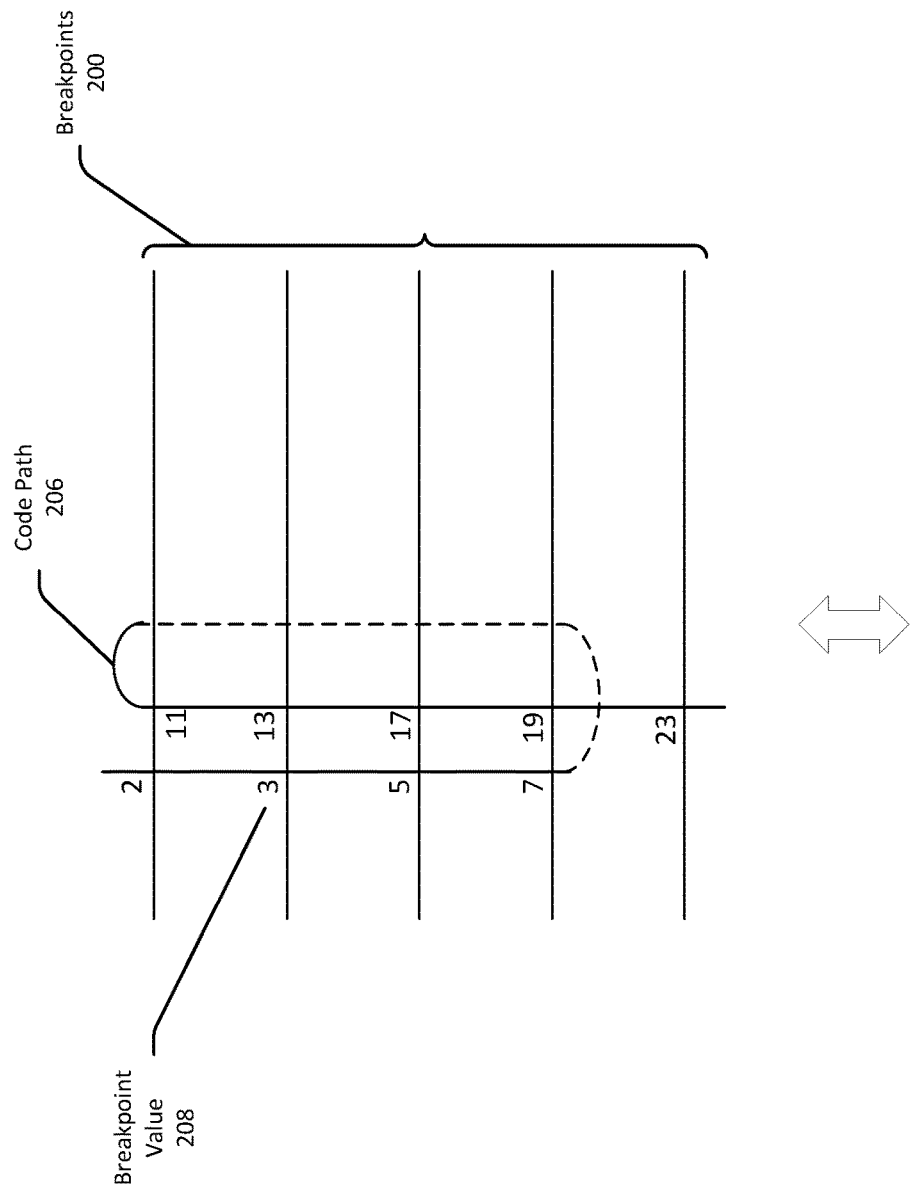

Various breakpoint value assignment/fingerprint generation algorithms are described herein. FIGS. 2A and 2B, for example, depict a prime number-based fingerprint generation algorithm in connection with two different code paths corresponding to execution of different regression tests. Referring first to FIG. 2A, a set of example breakpoints 200 are depicted. The breakpoints 200 may be at least a subset of the breakpoints contained in the source code 112. In example embodiments, execution of the regression test 110 may cause a code path 202 to be traversed. In accordance with the prime number-based breakpoint value assignment/fingerprint generation algorithm according to example embodiments of the invention, prime number values 204 may be consecutively assigned to breakpoints as they are encountered during execution of the regression test 110. In example embodiments, the prime numbers may be reserved in advance and assigned to breakpoints as needed. In other example embodiments, each next consecutive prime number may be dynamically calculated and assigned as a next breakpoint is encountered during execution of the regression test 110.

For instance, as depicted in FIG. 2A, a first breakpoint encountered during execution of the regression test 110 may be assigned the prime number value 2 and a second breakpoint encountered may be assigned the next consecutive prime number value of 3. As shown in FIG. 2A, the code path 202 then returns to the first breakpoint, which is assigned the next consecutive prime number value of 5, followed by the second breakpoint again, which is assigned the next prime number value 7. The code path 202 then traverses a third breakpoint, which is assigned the prime number value 11, and a fourth breakpoint, which is assigned the prime number value 13. The code path returns to the third breakpoint, which is assigned the prime number value 17, followed by the fourth breakpoint again, which is assigned the prime number value 19. Finally, the code path 202 traverses a fifth breakpoint, which is assigned the prime number value 23.

It should be appreciated that a respective prime number value is assigned to each encounter of a breakpoint during execution of the regression test 110. In example embodiments, each breakpoint 200 may be identified by a corresponding identifier, which in turn, may be stored in association with each breakpoint value 204 that is assigned to the breakpoint during traversal of the code path 202. For instance, the breakpoint values 2 and 5 may be stored in association with an identifier of the first breakpoint; the values 3 and 7 may be stored in association with an identifier of the second breakpoint; the values 11 and 17 may be stored in association with an identifier of the third breakpoint; the values 13 and 19 may be stored in association with an identifier of the fourth breakpoint; and the value 23 may be stored in association with an identifier of the fifth breakpoint. It should further be appreciated the code path 202 (and any illustrative code path depicted and described herein) is merely exemplary and that a code path may traverse any number of breakpoints any number of times.

In example embodiments that utilize the prime number-based breakpoint value assignment/fingerprint generation algorithm, the fingerprint determination module(s) 106 may generate the fingerprint 114 based on the prime number values assigned to the breakpoint encounters. More specifically, the fingerprint determination module(s) 106 may aggregate, for each breakpoint encountered at least once during traversal of the code path 202, the breakpoint values (e.g., the prime number values) assigned to the encounters of that breakpoint. An indexed data structure (e.g., an array, a vector, etc.) may then be populated with these aggregate values. The indexed data structure may represent the fingerprint 114. In example embodiments, aggregating the breakpoint values may involve multiplying the values assigned to each breakpoint together to obtain the aggregate/composite value corresponding to each breakpoint.

For instance, referring again to the specific code path 202 depicted in FIG. 2A, the breakpoint values 2 and 5 assigned to the encounters with the first breakpoint during traversal of the code path 202 may be multiplied to obtain the value 10. Similarly, the breakpoint values 3 and 7 assigned to the encounters with the second breakpoint may be multiplied to obtain the value 21; the breakpoint values 11 and 17 assigned to the encounters with the third breakpoint may be multiplied to obtain the value 187; and the breakpoint values 13 and 19 assigned to the encounters with the fourth breakpoint may be multiplied to obtain the value 247. An indexed data structure is then populated with these aggregate values. Since only one breakpoint value (23) is assigned to the fifth breakpoint because the fifth breakpoint is encountered only once in the example code path 202, no aggregation is needed and the indexed data structure is additionally populated with the single prime number value of 23.

In the above-described manner, the indexed data structure <10, 21, 187, 247, 23> may represent the fingerprint 114 for an example regression test 110 that traverses the example code path 202. In example embodiments, the data structure <10, 21, 187, 247, 23> may be indexed with respect to those breakpoints that are encountered during traversal of the code path 202. In particular, in example embodiments, the first value in the example fingerprint 114 given by <10, 21, 187, 247, 23> (e.g., the value 10) may be linked to the first breakpoint encountered during traversal of the code path 202; the second value 21 may be linked to the second breakpoint encountered; and so on. In example embodiments, the fingerprint 114 may only include values for breakpoints that are encountered during traversal of a code path. For instance, the example fingerprint 114 given by <10, 21, 187, 247, 23> only includes values corresponding to breakpoints that are encountered during traversal of the code path 202, which may not be consecutive breakpoints within the source code 112. For instance, the first through fifth breakpoints described in reference to FIG. 2A may actually correspond to non-consecutive breakpoints among all breakpoints present in the source code 112. In other example embodiments, all breakpoints present in the source code 112 may be indexed in the fingerprint 114, with those breakpoints not encountered during traversal of the code path 202, and thus, not assigned a breakpoint number value having a corresponding zero value in the fingerprint 114.

In example embodiments, the fingerprint 114 given by <10, 21, 187, 247, 23> that is generated for the example code path 202 using the prime number-based breakpoint value assignment/fingerprint generation algorithm is reversible to reconstruct the code path 202. In particular, the fingerprint <10, 21, 187, 247, 23> can be used to determine which breakpoints are encountered during execution of the regression test case 110, the number of encounters for each such breakpoint, and the order in which the breakpoint encounters occur. More specifically, a prime factorization of each of the values in the fingerprint <10, 21, 187, 247, 23> can be performed to reconstruct the code path 202. The order in which the breakpoints are encountered is discernible because the algorithm assigned the prime number to the breakpoint encounters in a consecutive manner.

For instance, the first value in the fingerprint <10, 21, 187, 247, 23> can be broken down into its prime factors 2 and 5. Similarly, the second value in the fingerprint can be broken down into its prime factors 3 and 7; the third value prime factorizes to 11 and 17; the fourth value to 13 and 19; and the fifth value is itself a prime number, and thus, already in reduced form. Because the prime numbers are consecutively assigned during execution of the regression test 110, the code path 202—including the order in which breakpoint encounters occur—can be exactly reconstructed. That is, it can be discerned that the first and third encounters (represented by the prime numbers 2 and 5, respectively) involve the first breakpoint; the second and fourth encounters (represented by the prime numbers 3 and 7, respectively) involve the second breakpoint; the fifth and seventh encounters (represented by the prime numbers 11 and 17, respectively) involve the third breakpoint; the sixth and eighth encounters (represented by the prime numbers 13 and 19, respectively) involve the fourth breakpoint; and the ninth encounter (represented by the prime number 23) involves the fifth breakpoint. As such, the following order of breakpoint encounters that occur during traversal of the code path 202 can be discerned from the fingerprint <10, 21, 187, 247, 23>: Breakpoint 1->Breakpoint 2->Breakpoint 1->Breakpoint 2->Breakpoint 3->Breakpoint 4->Breakpoint 3->Breakpoint 4->Breakpoint 5.

In example embodiments, the prime number-based breakpoint value assignment/fingerprint generation algorithm generates a fingerprint 114 that uniquely identifies the code path traversed during execution of a corresponding regression test 110. More specifically, the prime number-based breakpoint value assignment/fingerprint generation algorithm generates a fingerprint 114 that identifies not only the breakpoints encountered during traversal of a code path and the number of times each such breakpoint is encountered, but also the order in which the encounters occur. Thus, if execution of two different regression tests results in code paths that encounter the same breakpoints the same number of times but in different orders, the respective fingerprint generated for each regression test will uniquely identify the particular order in which breakpoint encounters occur for that regression test.

For instance, FIG. 2B depicts an alternative code path 206 that may result from the execution of a different regression test than the regression test that generates the code path 202 depicted in FIG. 2A. As with FIG. 2A, prime number values 208 may be consecutively assigned as breakpoints are encountered during the code path 206. The prime number values may be aggregated as previously described to obtain the fingerprint <22, 39, 85, 133, 23>. The code path 206 can then be reconstructed from this fingerprint. In particular, the first value in the fingerprint <22, 39, 85, 133, 23> can be broken down into its prime factors 2 and 11. Similarly, the second value in the fingerprint can be broken down into its prime factors 3 and 13; the third value prime factorizes to 5 and 17; the fourth value to 7 and 19; and the fifth value is itself a prime number, and thus, already in reduced form. Because the prime numbers are consecutively assigned during execution of the regression test, the code path 206—including the order in which breakpoint encounters occur—can be exactly reconstructed. That is, it can be discerned that the first and fifth encounters (represented by the prime numbers 2 and 11, respectively) involve the first breakpoint; the second and sixth encounters (represented by the prime numbers 3 and 13, respectively) involve the second breakpoint; the third and seventh encounters (represented by the prime numbers 5 and 17, respectively) involve the third breakpoint; the fourth and eighth encounters (represented by the prime numbers 7 and 19, respectively) involve the fourth breakpoint; and the ninth encounter (represented by the prime number 23) involves the fifth breakpoint. As such, the following order of breakpoint encounters that occur during traversal of the code path 206 can be discerned from the fingerprint <22, 39, 85, 133, 23>: Breakpoint 1->Breakpoint 2->Breakpoint 3->Breakpoint 4->Breakpoint 1->Breakpoint 2->Breakpoint 3->Breakpoint 4->Breakpoint 5. Thus, although the code path 202 and the code path 206 traverse the same breakpoints the same number of times, the fingerprint <22, 39, 85, 133, 23>uniquely identifies the order in which breakpoint encounters occur in the code path 206, while the fingerprint <10, 21, 187, 247, 23> uniquely identifies the order in which breakpoint encounters occur in the code path 202.

Figure 3A:
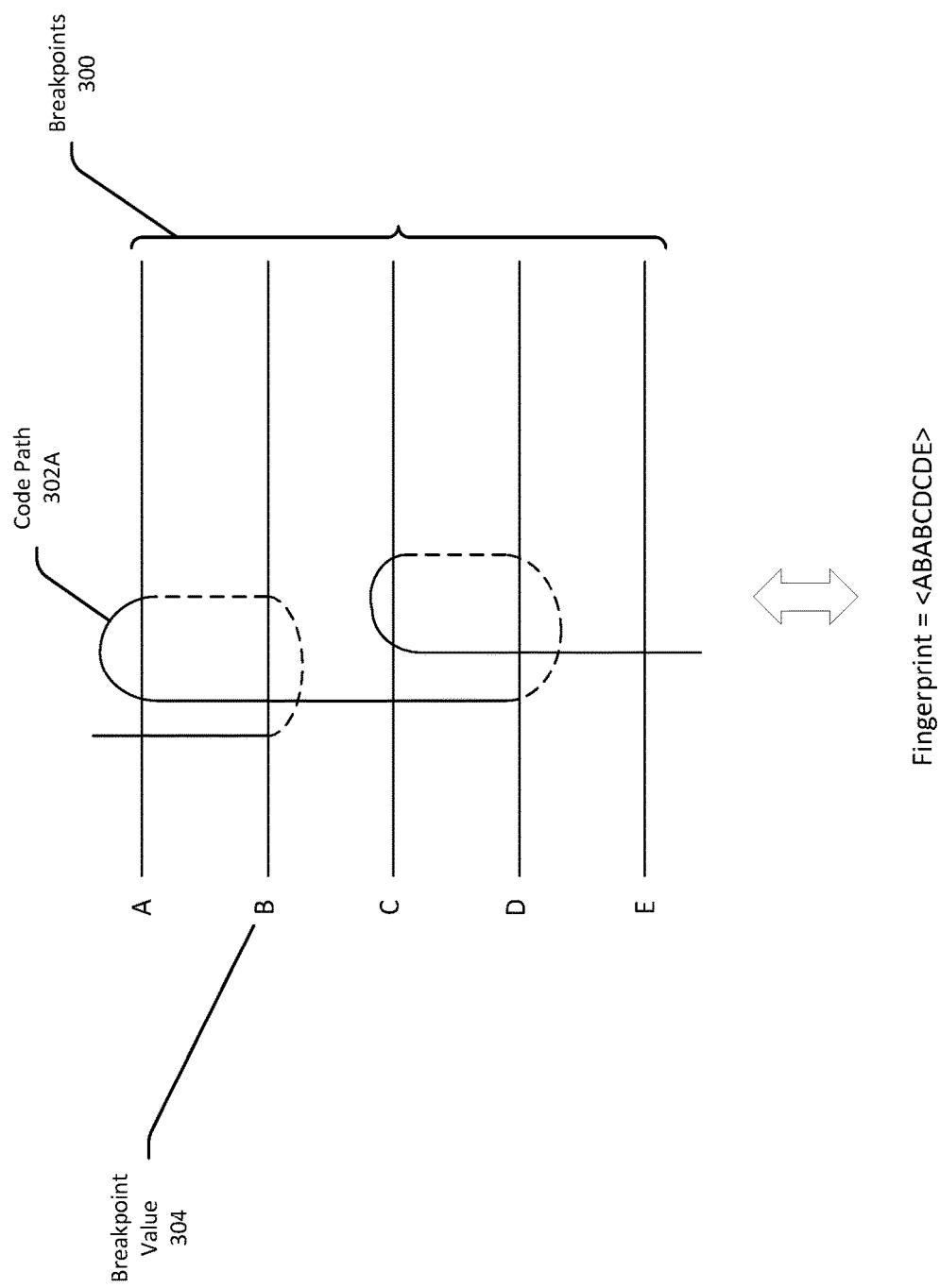
FIGS. 3A and 3B depict example code paths taken during regression testing and corresponding fingerprints generated in accordance with a string-based fingerprint generation algorithm in accordance with one or more example embodiments of the invention.
Figure 3B:
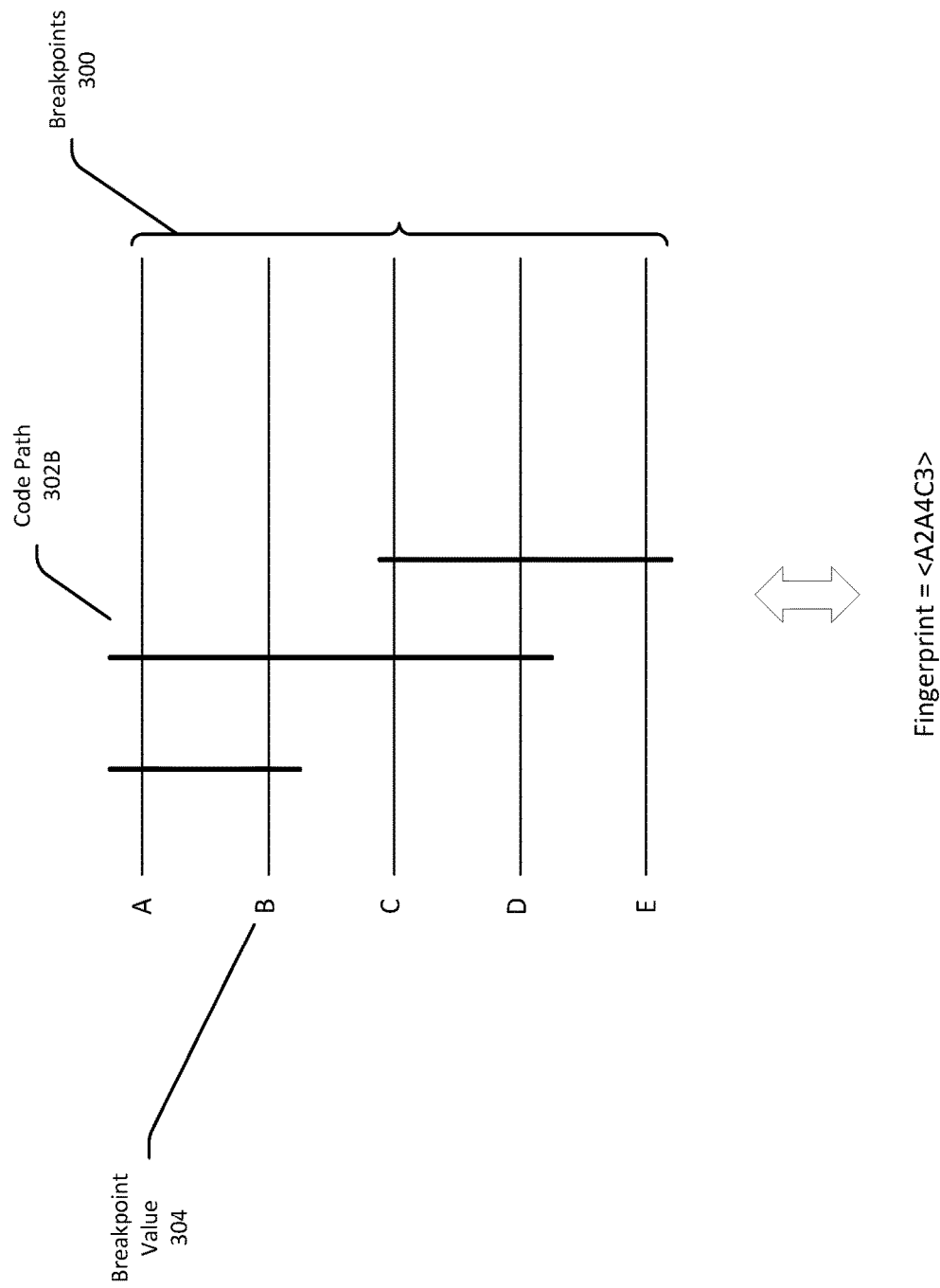

FIGS. 3A and 3B depict an alternative string-based fingerprint generation algorithm for generating fingerprints that uniquely identify code paths taken during execution of regression tests accordance with one or more example embodiments of the invention. FIG. 3A depicts a collection of breakpoints 300 that are encountered during execution of a regression test. In contrast to the prime number-based algorithm described in reference to FIGS. 2A and 2B, a single breakpoint value 304 is assigned to each breakpoint 300 that is encountered in accordance with the string-based algorithm. Thus, the first breakpoint encountered may be assigned a breakpoint value represented by the character 'A'; the second breakpoint encountered may be assigned a breakpoint value represented by the character 'B'; the third breakpoint encountered may be assigned a breakpoint value represented by the character 'C'; the fourth breakpoint encountered may be assigned a breakpoint value represented by the character 'D'; and the fifth breakpoint encountered may be assigned a breakpoint value represented by the character 'E'.

In example embodiments, the breakpoint values 304 may be dynamically assigned to the breakpoints as they are encountered, in which case, each assigned breakpoint value may be stored in association with another identifier of the breakpoint to which it has been assigned. In other example embodiments, the breakpoint values may be statically assigned to all breakpoints in the source code 112 in advance. In either case, in contrast to the prime number-based algorithm, a distinct breakpoint value is not assigned for each encounter of a breakpoint in the string-based algorithm. Rather, a single breakpoint value is assigned to each breakpoint that is encountered, and the fingerprint 114 that is generated is a string of breakpoint values that identifies how many times each breakpoint is encountered and the order in which they are encountered.

For instance, the code path 302A depicted in FIG. 3A is identical to the code path 202 depicted in FIG. 2A. However, in accordance with the string-based algorithm, the fingerprint <ABABCDCDE> is instead generated, from which the code path 302A can be discerned. In particular, each element of the string <ABABCDCDE> identifies a corresponding breakpoint that is encountered; the number of times that the same element appears in the string indicates the number of times the corresponding breakpoint is encountered; and the ordering of the elements in the string indicates the order in which the breakpoints are encountered.

FIG. 3B depicts an alternative representation 302B for the same code path 302A depicted in FIG. 3A and an alternative means for representing the corresponding fingerprint that conveys the same information as the fingerprint depicted in FIG. 3A. In particular, the fingerprint given by <A2A4C3> indicates that traversal of the code path 302B first encounters the breakpoint assigned the breakpoint value 'A' followed by the breakpoint assigned the breakpoint value 'B'; then encounters the 'A' breakpoint again followed by the breakpoints respectively assigned the breakpoint values 'B', 'C', and 'D'; and then encounters the breakpoint assigned the breakpoint value 'C' followed by the breakpoints respectively assigned the values 'D' and 'E'. The alternative fingerprint depicted in FIG. 3B assumes that an ordering of the breakpoint values assigned to breakpoints is known.

In example embodiments, both the prime number-based algorithm and the string-based algorithm generate unique fingerprints from which corresponding code paths taken can be uniquely reconstructed. In certain example embodiments, the prime number-based algorithm provides a fingerprint with even more granularity than the string-based algorithm. In particular, with the prime number-based algorithm, the number of times any given breakpoint is encountered and the order in which that breakpoint is encountered can be discerned simply from deconstructing (e.g., prime factoring) the corresponding indexed value in the fingerprint. In contrast, with the string-based algorithm, the entire fingerprint string would need to be searched to determine, for any given breakpoint, the number of times it was encountered during traversal of a code path and the order in which it was encountered. In certain example embodiments, however, the string-based algorithm may provide a performance boost over the prime number-based algorithm because a performance-friendly elastic search can be performed of the string fingerprint.

Figure 4A:
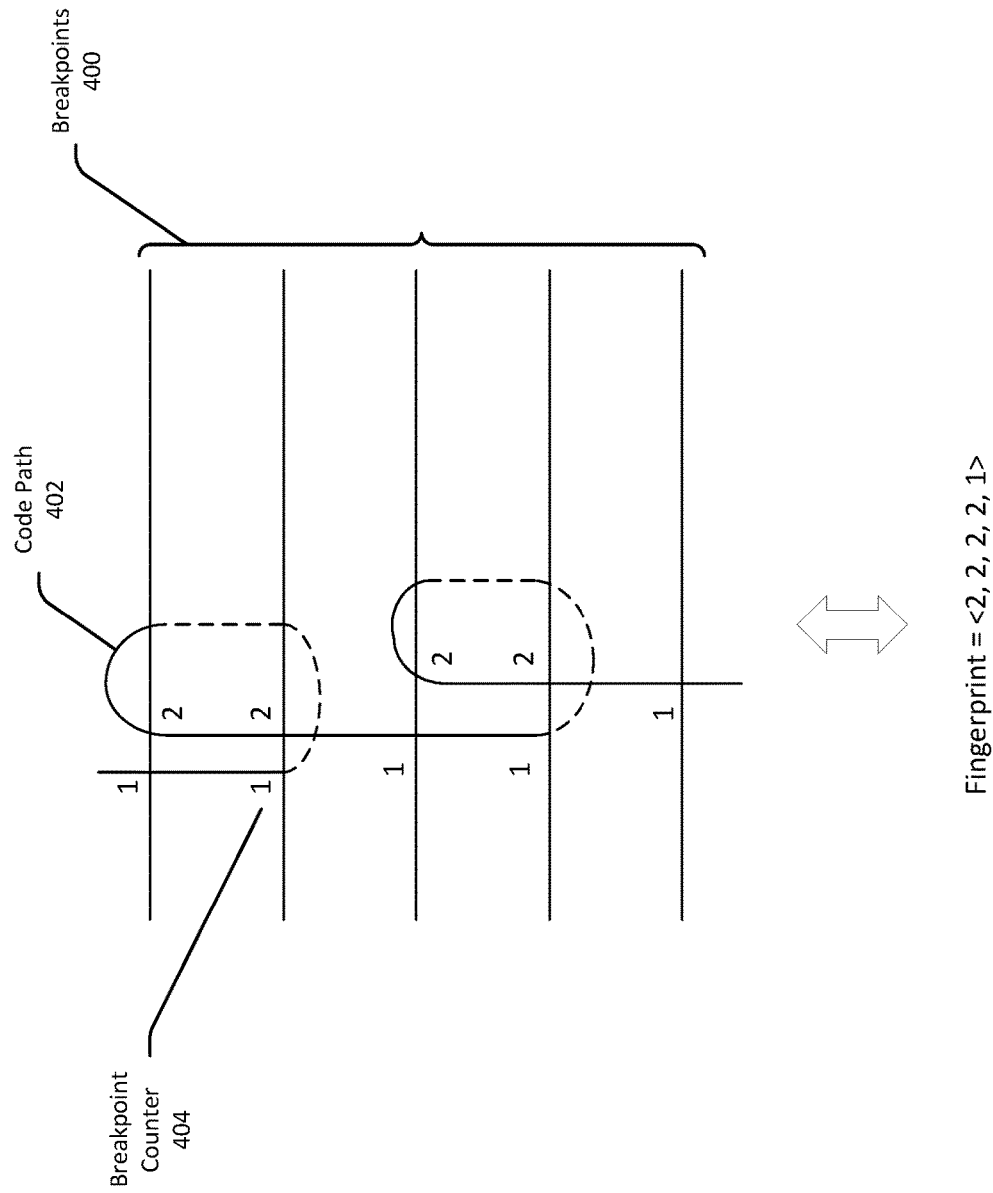
FIGS. 4A and 4B depict example code paths taken during regression testing and corresponding fingerprints generated in accordance with a bitmap-based fingerprint generation algorithm in accordance with one or more example embodiments of the invention.
Figure 4B:
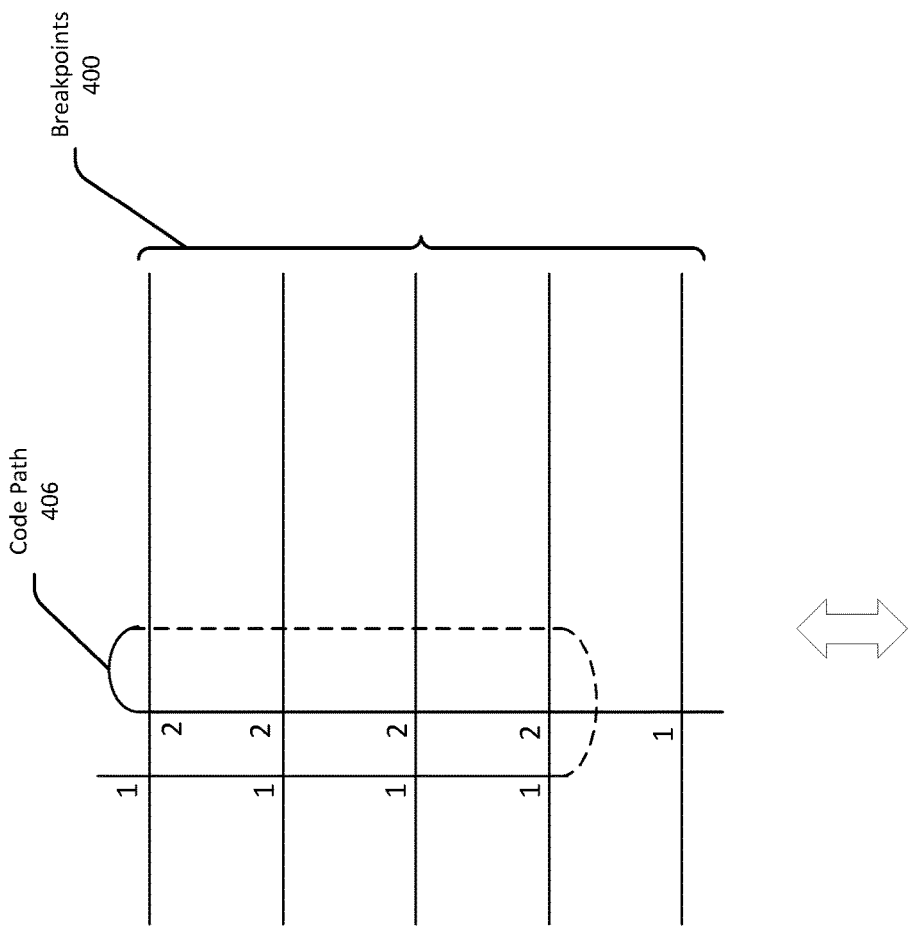

FIGS. 4A and 4B depict an alternative bitmap-based fingerprint generation algorithm in accordance with one or more example embodiments of the invention. Referring first to FIG. 4A, a collection of breakpoints 400 are depicted. A breakpoint counter 404 may be maintained for each breakpoint that is encountered. The respective breakpoint counter 404 for each breakpoint may be incremented as that breakpoint is encountered. Thus, the fingerprint generated for the example code path 402 depicted in FIG. 4A, would be given by <2, 2, 2, 2, 1>, where each value in the fingerprint represents the counter value for a corresponding breakpoint that indicates the number of times that breakpoint was encountered.

In example embodiments, a fingerprint generated according to the bitmap-based algorithm identifies each breakpoint that is encountered during a code path traversal as well as the number of times each such breakpoint is encountered. However, in certain example embodiments, a fingerprint generated according to the bitmap-based algorithm may not uniquely identify a corresponding code path, that is, an order in which the breakpoints are encountered. For instance, the code path 402 depicted in FIG. 4A is represented by the fingerprint <2, 2, 2, 2, 1>. However, the code path 406 depicted in FIG. 4B is also represented by the same fingerprint using the bitmap-based algorithm. The code paths 402 and 406 are, however, clearly different. In particular, the code path 402 is identical to the code path 202 depicted in FIG. 2A and the code path 406 is identical to the code path 206 depicted in FIG. 2B. While the prime number-based algorithm and the string-based algorithm generate respective fingerprints that uniquely identify these different code paths, the bitmap-based algorithm generates the same fingerprint for these different code paths.

One or more illustrative embodiments of the invention are described herein. Such embodiments are merely illustrative of the scope of this invention and are not intended to be limiting in any way. Accordingly, variations, modifications, and equivalents of embodiments disclosed herein are also within the scope of this invention.

Figure 6:
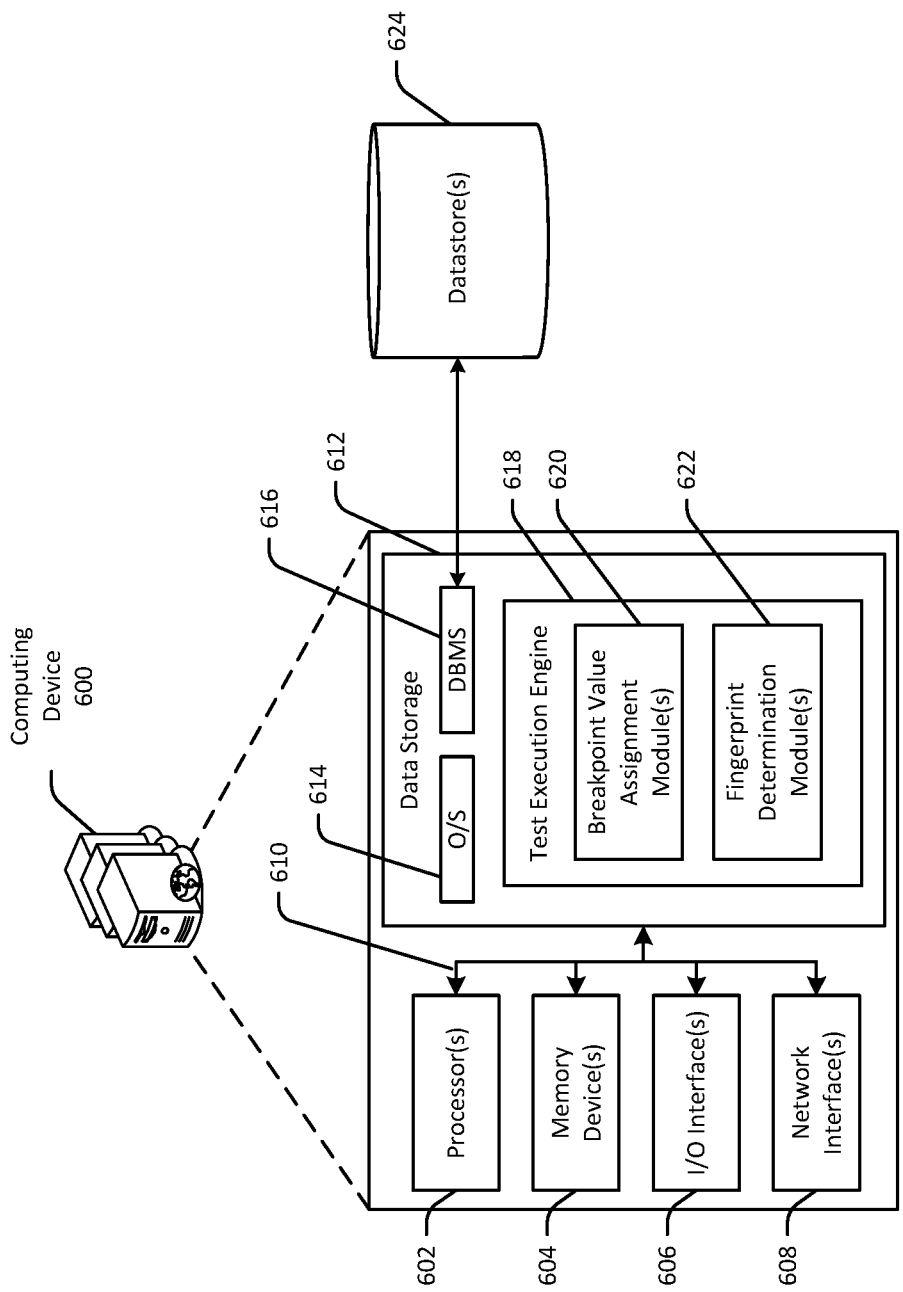
FIG. 6 is a schematic diagram of an illustrative computing device configured to implement one or more example embodiments of the invention.

FIG. 6 is a schematic diagram of an illustrative computing device 600 configured to implement one or more example embodiments of the invention. The illustrative computing device 600 may include a server or collection of servers; a personal computer; a handheld device; or the like. While the computing device 600 and/or any particular component of the computing device 600 may be described herein in the singular, it should be appreciated that multiple instances of the computing device 600 and/or any component thereof may be provided and functionality described in connection with the computing device 600 may be distributed across multiple computing devices 600 and/or across multiple instances of any particular component of the computing device 600.

In an illustrative configuration, the computing device 600 may include one or more processors (processor(s)) 602, one or more memory devices 604 (generically referred to herein as memory 604), one or more input/output ("I/O") interfaces 606, one or more network interfaces 608, and data storage 612. The computing device 600 may further include one or more buses 610 that functionally couple various components of the computing device 600.

The bus(es) 610 may include at least one of a system bus, a memory bus, an address bus, or a message bus, and may permit the exchange of information (e.g., data (including computer-executable code), signaling, etc.) between various components of the computing device 600. The bus(es) 610 may include, without limitation, a memory bus or a memory controller, a peripheral bus, an accelerated graphics port, and so forth. The bus(es) 610 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 612 may include removable storage and/or non-removable storage including, but not limited to, magnetic storage, optical disk storage, and/or tape storage. The data storage 612 may provide non-volatile storage of computer-executable instructions and other data. The memory 604 and the data storage 612, removable and/or non-removable, are examples of computer-readable storage media (CRSM) as that term is used herein.

The data storage 612 may store computer-executable code, instructions, or the like that may be loadable into the memory 604 and executable by the processor(s) 602 to cause the processor(s) 602 to perform or initiate various operations. The data storage 612 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604 and may ultimately be copied to data storage 612 for non-volatile storage.

More specifically, the data storage 612 may store one or more operating systems (O/S) 614; one or more database management systems (DBMS) 616 configured to access the memory 604 and/or one or more external datastores 624; and one or more program modules, applications, engines, managers, computer-executable code, scripts, or the like such as, for example, a test execution engine 618 that may include one or more breakpoint value assignment modules 620 and one or more fingerprint determination modules 622. Any of the components depicted as being stored in data storage 612 may include any combination of software, firmware, and/or hardware. The software and/or firmware may include computer-executable instructions (e.g., computer-executable program code) that may be loaded into the memory 604 for execution by one or more of the processor(s) 602 to perform any of the operations described earlier in connection with correspondingly named modules/engines depicted in FIG. 1.

Although not depicted in FIG. 6, the data storage 612 may further store various types of data utilized by components of the computing device 600 (e.g., data stored in the datastore(s) 624). Any data stored in the data storage 612 may be loaded into the memory 604 for use by the processor(s) 602 in executing computer-executable instructions. In addition, any data stored in the data storage 612 may potentially be stored in the external datastore(s) 624 and may be accessed via the DBMS 616 and loaded in the memory 604 for use by the processor(s) 602 in executing computer-executable instructions.

The processor(s) 602 may be configured to access the memory 604 and execute computer-executable instructions loaded therein. For example, the processor(s) 602 may be configured to execute computer-executable instructions of the various program modules, applications, engines, managers, or the like of the computing device 600 to cause or facilitate various operations to be performed in accordance with one or more embodiments of the invention. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to other illustrative components depicted as being stored in the data storage 612, the O/S 614 may be loaded from the data storage 612 into the memory 604 and may provide an interface between other application software executing on the computing device 600 and hardware resources of the computing device 600. More specifically, the O/S 614 may include a set of computer-executable instructions for managing hardware resources of the computing device 600 and for providing common services to other application programs. In certain example embodiments, the O/S 614 may include or otherwise control the execution of one or more of the program modules, engines, managers, or the like depicted as being stored in the data storage 612. The O/S 614 may include any operating system now known or which may be developed in the future including, but not limited to, any server operating system, any mainframe operating system, or any other proprietary or non-proprietary operating system.

The DBMS 616 may be loaded into the memory 604 and may support functionality for accessing, retrieving, storing, and/or manipulating data stored in the memory 604, data stored in the data storage 612, and/or data stored in external datastore(s) 624. The DBMS 616 may use any of a variety of database models (e.g., relational model, object model, etc.) and may support any of a variety of query languages. The DBMS 616 may access data represented in one or more data schemas and stored in any suitable data repository. Data stored in the datastore(s) 624 may include, for example, breakpoint values; fingerprints; source code; regression tests; and so forth, any portion of which may alternatively or additionally be stored in the data storage 612. External datastore(s) 624 that may be accessible by the computing device 600 via the DBMS 616 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 600, the input/output (I/O) interface(s) 606 may facilitate the receipt of input information by the computing device 600 from one or more I/O devices as well as the output of information from the computing device 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 600 may further include one or more network interfaces 608 via which the computing device 600 may communicate with any of a variety of other systems, platforms, networks, devices, and so forth. The network interface(s) 608 may enable communication, for example, with one or more other devices via one or more of networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the program modules/engines depicted in FIG. 6 as being stored in the data storage 612 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the computing device 600 and/or other computing devices may be provided to support functionality provided by the modules depicted in FIG. 6 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 4 may be implemented, at least partially, in hardware and/or firmware across any number of devices.

It should further be appreciated that the computing device 600 may include alternate and/or additional hardware, software, or firmware components beyond those described or depicted without departing from the scope of the invention. More particularly, it should be appreciated that software, firmware, or hardware components depicted as forming part of the computing device 600 are merely illustrative and that some components may not be present or additional components may be provided in various embodiments. While various illustrative modules have been depicted and described as software modules stored in data storage 612, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the method 400 and/or the method 500 may be performed by one or more computing devices 600 having the illustrative configuration depicted in FIG. 6, or more specifically, by one or more program modules, engines, applications, or the like executable on such a device. It should be appreciated, however, that such operations may be implemented in connection with numerous other device configurations.

The operations described and depicted in the illustrative methods of FIGS. 4 and 5 may be carried out or performed in any suitable order as desired in various example embodiments of the invention. Additionally, in certain example embodiments, at least a portion of the operations may be carried out in parallel. Furthermore, in certain example embodiments, less, more, or different operations than those depicted in FIGS. 4 and 5 may be performed.

Although specific embodiments of the invention have been described, one of ordinary skill in the art will recognize that numerous other modifications and alternative embodiments are within the scope of the invention. For example, any of the functionality and/or processing capabilities described with respect to a particular system, system component, device, or device component may be performed by any other system, device, or component. Further, while various illustrative implementations and architectures have been described in accordance with embodiments of the invention, one of ordinary skill in the art will appreciate that numerous other modifications to the illustrative implementations and architectures described herein are also within the scope of this invention. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for generating a fingerprint for a regression test that is run on a System Under Test (SUT), the method comprising:
    identifying the regression test;
    assigning breakpoint values to breakpoints associated with the SUT; executing the regression test on the SUT;
    determining a code path traversed during execution of the regression test; and
    determining the fingerprint for the regression test based at least in part on the code path and the assigned breakpoint values,
    wherein information contained in the fingerprint identifies each breakpoint encountered during execution of the regression test and a respective number of times the breakpoint is encountered;
    wherein the SUT comprises source code and each of the breakpoints occurs before or
    after a respective one or more lines of the source code, and
    wherein assigning the breakpoint values to the breakpoints comprises assigning a next consecutive prime number value to each breakpoint as it is encountered on the code path traversed during execution of the regression test;
    wherein the code path indicates both a respective number of times and an order in which each breakpoint is encountered during execution of the regression test.

2. The computer-implemented method of claim 1, wherein the breakpoints comprise a first set of one or more breakpoints, each of which is assigned a respective plurality of prime number values, and wherein determining the fingerprint for the regression test comprises:
    aggregating, for each breakpoint in the first set of one or more breakpoints, the respective plurality of prime number values to obtain a respective composite value; and
    populating an indexed data structure with each respective composite value.

3. The computer-implemented method of claim 2, wherein the aggregating comprises multiplying together each prime number value in the respective plurality of prime number values to obtain the respective composite value.

4. The computer-implemented method of claim 2, wherein the breakpoints further comprise a second set of one or more breakpoints, each of which is assigned a respective single prime number value, the method further comprising populating the indexed data structure with each respective single prime number value.

5. The computer-implemented method of claim 2, wherein each value in the indexed data structure corresponds to a respective breakpoint, the method further comprising reconstructing the code path traversed during execution of the regression test at least in part by:
    determining, for each value in the indexed data structure, a respective one or more prime number values contained in the value; and
    reconstructing the code path based at least in part on each respective one or more prime number values.

6. A system for generating a fingerprint for a regression test that is run on a System Under Test (SUT), the system comprising:
    at least one processor; and
    at least one memory storing computer-executable instructions, wherein the at least one processor is configured to access the at least one memory and execute the computer-executable instructions to:
    identify the regression test;
    assign breakpoint values to breakpoints associated with the SUT; execute the regression test on the SUT;
    determine a code path traversed during execution of the regression test; and
    determine the fingerprint for the regression test based at least in part on the code path and the assigned breakpoint values,
    wherein information contained in the fingerprint identifies each breakpoint encountered during execution of the regression test and a respective number of times the breakpoint is encountered;
    wherein the SUT comprises source code and each of the breakpoints occurs before or
    after a respective one or more lines of the source code, and
    wherein assigning the breakpoint values to the breakpoints comprises assigning a next consecutive prime number value to each breakpoint as it is encountered on the code path traversed during execution of the regression test;
    wherein the code path indicates both a respective number of times and an order in which each breakpoint is encountered during execution of the regression test.

7. The system of claim 6, wherein the breakpoints comprise a first set of one or more breakpoints, each of which is assigned a respective plurality of prime number values, and wherein the at least one processor is configured to determine the fingerprint for the regression test by executing the computer-executable instructions to:
    aggregate, for each breakpoint in the first set of one or more breakpoints, the respective plurality of prime number values to obtain a respective composite value; and
    populate an indexed data structure with each respective composite value.

8. The system of claim 7, wherein the aggregating comprises multiplying together each prime number value in the respective plurality of prime number values to obtain the respective composite value.

9. The system of claim 7, wherein the breakpoints further comprise a second set of one or more breakpoints, each of which is assigned a respective single prime number value, and wherein the at least one processor is further configured to execute the computer-executable instructions to populate the indexed data structure with each respective single prime number value.

10. The system of claim 7, wherein each value in the indexed data structure corresponds to a respective breakpoint, and wherein the at least one processor is further configured to execute the computer-executable instructions to reconstruct the code path traversed during execution of the regression test at least in part by:
- determining, for each value in the indexed data structure, a respective one or more prime number values contained in the value; and
- reconstructing the code path based at least in part on each respective one or more prime number values.

11. A computer program product for generating a fingerprint for a regression test that is run on a System Under Test (SUT), the computer program product comprising a computer readable storage medium having program instructions embodied therewith, the program instructions readable by a processing circuit to cause the processing circuit to perform a method comprising:
- identifying the regression test;
- assigning breakpoint values to breakpoints associated with the SUT; executing the regression test on the SUT;
- determining a code path traversed during execution of the regression test; and
- determining the fingerprint for the regression test based at least in part on the code path and the assigned breakpoint values,
- wherein information contained in the fingerprint identifies each breakpoint encountered during execution of the regression test and a respective number of times the breakpoint is encountered;
- wherein the SUT comprises source code and each of the breakpoints occurs before or after a respective one or more lines of the source code, and wherein assigning the breakpoint values to the breakpoints comprises assigning a next consecutive prime number value to each breakpoint as it is encountered on the code path traversed during execution of the regression test;
- wherein the code path indicates both a respective number of times and an order in which each breakpoint is encountered during execution of the regression test.

12. The computer program product of claim 11, wherein the breakpoints comprise a first set of one or more breakpoints, each of which is assigned a respective plurality of prime number values, and wherein determining the fingerprint for the regression test comprises:
- aggregating, for each breakpoint in the first set of one or more breakpoints, the respective plurality of prime number values to obtain a respective composite value, wherein the aggregating comprises multiplying together each prime number value in the respective plurality of prime number values to obtain the respective composite value; and
- populating an indexed data structure with each respective composite value.

13. The computer program product of claim 12, wherein the breakpoints further comprise a second set of one or more breakpoints, each of which is assigned a respective single prime number value, the method further comprising populating the indexed data structure with each respective single prime number.

14. The computer program product of claim 13, wherein each value in the indexed data structure corresponds to a respective breakpoint, the method further comprising reconstructing the code path traversed during execution of the regression test at least in part by:
- determining, for each value in the indexed data structure, a respective one or more prime number values contained in the value; and
- reconstructing the code path based at least in part on each respective one or more prime number values.

* * * * *